Patented Nov. 7, 1933

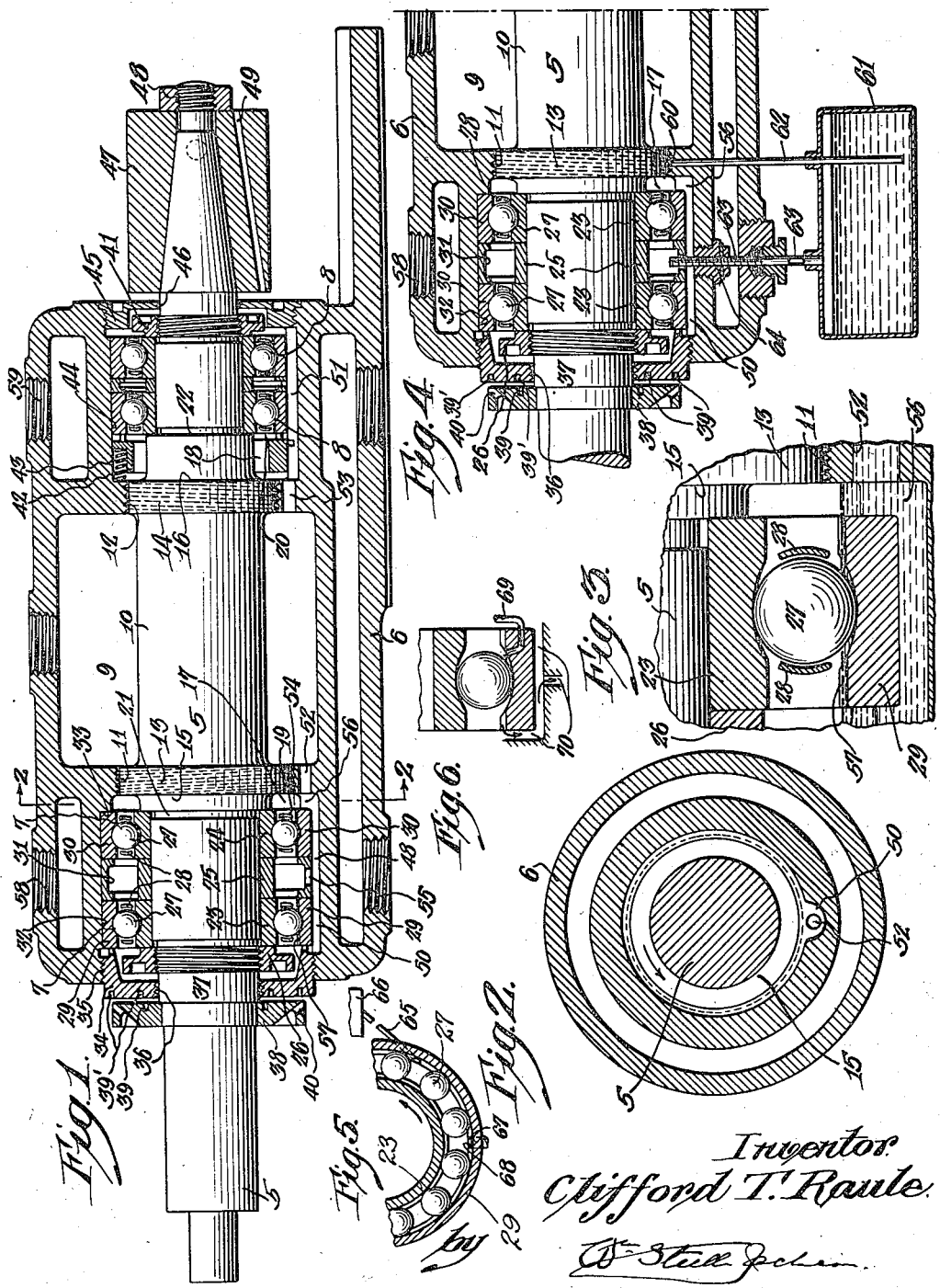

1,934,278

UNITED STATES PATENT OFFICE 1,934,278

WATER COOLED OILING SYSTEM FOR BALL BEARINGS

Clifford T. Raule, Brookline, Pa.

Application July 11, 1929. Serial No. 377,406

7 Claims. (Cl. 308—187)

My invention relates to horizontal high speed roller bearings with particular reference to the lubrication thereof.

A purpose of my invention is to maintain a definite small depth of oil inside the bottom portions of the stationary races of a horizontal high speed roller bearing, so that each ball must race through a very small depth of oil each time it passes the bottom of its orbit. The oil spreads over the surface of the roller to maintain an oil film between the rollers and the ball retainers.

A further purpose is to flow oil by gravity into the bottom portions of the inside races of a horizontal high speed bearing and to limit the upward level of the oil by continuously pumping it outwardly.

A further purpose is to pump oil into or out of roller bearings by the cooperating action of a spiral grove inside the stationary housing of a high speed shaft and the adjoining surface of the speeding shaft.

A further purpose is to simultaneously protect a high speed bearing adjacent a driving pulley from abrasive dust in an operating room and to air cool the pulley by providing one or more rearwardly outwardly tapering perforations through the length of the pulley.

A further purpose is to protect a roller bearing from abrasive dust in an operating room by means of an outward spiralling groove in the housing of the shaft, the groove being closely adjacent the shaft.

A further purpose is to simultaneously water cool and lubricate a high speed roller bearing.

Further purposes will appear in the specification and in the claims.

My invention relates to the methods involved and to apparatus by which the methods may be carried out.

I have elected to show one main form only, and a minor modification of my invention, selecting a form that is practical and efficient in operation and which well illustrates the principles involved.

Figure 1 is a sectional elevation showing a roller bearing embodying a desirable form of my invention.

Figure 2 is a section taken upon the line 2—2 of Figure 1.

Figure 3 is a fragmentary view corresponding generally to Figure 1 but showing a somewhat different form.

Figure 4 is an enlarged fragment of Figure 1.

Figures 5 and 6 are rather diagrammatic sectional views showing applications of my methods to ball bearings.

Like numerals refer to like parts in all figures.

Describing in illustration and not in limitation and referring to the drawing:—

In the past there has been great difficulty in preventing high speed roller bearings from overheating. While roller bearings running at speeds of the order of 200 R. P. M. keep cool and operate satisfactorily almost indefinitely, the high speed bearings running at 10,000 R. P. M. and upwards have hitherto heated to an extent that has resulted in the bearings quickly wearing out.

This heating has been incident chiefly to friction between the balls and the ball retainers.

Attempts have been made to maintain the balls lubricated but these have not been satisfactory except when the speeds are relatively low. A low speed bearing may be filled with grease and run indefinitely, apparently without wear but the same bearing run at a high speed, of for example 10,000 R. P. M. may not last a single day and the balls and raceways, either or both have to be replaced at frequent intervals.

I have discovered that the excessive heating in the high speed roller bearings has been due to either too little or too much oil in the bearings.

If the oil be inadequate, the engagement between the individual balls and the ball retainers quickly goes dry and the retainers and balls both heat up and burn to an extent that quickly destroys the effectiveness of the bearing.

If, on the other hand there be an excessive amount of oil present in the bearing, this oil is thrown about in the bearing to an extent that produces an amount of friction that may readily be even in excess of that which would be present if no oil at all were present.

My invention is directed to providing means for maintaining as much oil as is needed to greatly lessen friction but no more than this amount.

In Figure 1 the horizontal high speed shaft 5, for a grinding wheel or the like has a horizontal roller bearing support in a stationary housing 6, the housing member 6 carrying at its opposite ends double ball bearings 7 and 8 respectively.

The housing is outwardly recessed intermediate the hearings to form an annular oil compartment 9 around the intermediate portion 10 of the shaft, which may be correspondingly recessed inwardly to increase the volume of the compartment which is a reservoir for the oil supply.

The interior surface of the housing is provided with spiral grooves 11 and 12 at opposite ends of the oil reservoir 9, the inwardly projecting threads of the grooves fitting loosely against the outwardly presented plain surfaces 13 and 14 of the shaft, the grooves spiralling right hand or left hand according to the direction of rotation of the shaft, the direction of spiralling of the grooves being such that the rotation of the shaft tends to move any oil in the grooves inwardly along the grooves to the oil compartment.

The shaft is reduced in diameter at 15 and 16 at the outer ends of the grooves 11 and 12 to provide conduit spaces 17 and 18 across the openings 19 and 20 between the inner and outer races of the two bearings, and is further reduced at 21 and 22 to provide shoulders to position the inner races.

The ball bearing 7 includes inner races 23 and 24 and an intermediate inner ring 25, the three members being clamped between the shoulder 21 and the inwardly directed face of a nut 26 threaded upon the shaft. The ball members 27 lie between the ball retainers 28 and the stationary outside races 29 and 30.

The outer races at the left side of the bearing, and an intermediate ring 31 fit in a bore 32 of the housing and are clamped together against a shoulder 33 by the inner end of a sleeve or follower member 34 threaded at 35 into the housing.

The follower ring 34 is provided with a spiral groove 36 along a straight portion 37 of the shaft, the direction of the spiralling of the groove being made such as to tend to discharge outwardly any dust or other deposits that might otherwise tend to work inward to the bearing between the outside of the shaft and the inside of the follower ring.

The shaft is shown carrying a shield member 38 adjacent the follower ring, the purpose of this shield member being to discharge away from the bearing any abrasive particles around the machine. The shield and follower ring are spirally grooved at 39, 39' on the faces toward each other. The shield is diagonally operated at one or more places as at 40 to give a draft across the space between the ring and follower which draft is outwardly directed. Whatever circumferential air movement is set up between the ring and follower by reason of the rotation of the ring, causes the air to work outwardly along the paths of the spiral grooves in the ring and follower; and this outward movement is assisted by the diagonal blast of air from the apertures.

At the right hand end of the shaft the inner races are fastened to place against the shoulder 22 by the nut 41 threaded upon the shaft as already described for the left hand inner races.

The outer races at the right are spring pressed outwardly by a follower member 42 that is put to place before the outer races and balls are installed, this follower ring being spring pressed at 43 longitudinally toward the right.

The outer races at the right are adapted to slide along an interior bore 44 of the housing except as prevented by the ball members. The spring follower member 42 prevents the shaft from having any longitudinal play.

An outside cover member 45 generally similar to the sleeve 34 provides a dust shield for the roller bearings and is grooved at 46 in the same way as the groove 36 at the other end of the shaft, in order to eliminate any danger of abrasive dust working inward along the shaft, the direction of the groove being such with respect to the direction of rotation of the shaft as to cast outward any dust or other material that gets into the space between the shaft and the groove.

The driving pulley 47 is fastened to the shaft at 48 and is provided with one or more rearwardly and outwardly tapering bores 49 which, by centrifugal action, sends a rapid current of moving air through the body of the pulley rearwardly along the bore to simultaneously cool the pulley and to prevent abrasive particles around the machine from getting to the bearing. If desired the annular facing surfaces of the cover and pulley can be spirally grooved as in the case of the sleeve 34 and shield at the end of the bearing.

I downwardly groove the interior of the housing at 50 and 51 to form oil passages beneath the stationary races at each ball bearing and bore suitable holes 52 and 53 through inwardly directed flanges from the inner ends of the grooves into the interior compartment 9 so that oil may flow by gravity out of the interior compartment through the holes 52 and 53 into the grooves 50 and 51 beneath the stationary races, and thence upwardly through passages 54, 55 and 56 to overflow into the grooves of the outer races at the bottom of these races.

The quantity of oil flowing into the stationary races should be variant according to operating conditions but usually should be quite small and may be a mere film of oil upon the bottom portion of each outer race; and I may grind downward passages 57 into the walls of the groove raceways to lessen the depth of oil which is maintained in the bottom portion of each raceway.

The elevation of oil inside the bearing compartments is limited by the inlet level of the spiral groove pumps 11 and 12, formed by the inwardly directed grooves spiralling around the inside of the casing and the surface of the speeding shaft adjacent the inwardly directed edge of the spiralling threads.

A suitable indefinite quantity of oil is placed in the middle oil compartment 9 of the casing. This oil flows through the holes 52 and 53 into the groove channels 50 and 51 beneath the outer races and rises up through suitable openings at 54, 55 and 56 to flood from opposite sides the inside of the outer races with what may preferably be little more than a mere film of oil at the extreme bottom of the stationary outer races.

The oil is kept at a constant level, such as is required to give the right amount of oil in the bottom of each outer race, by being continuously pumped back by the speeding shaft through the stationary grooves 11 and 12 into the oil supply compartment 9. These screw pumps are adapted to withdraw oil from the bearing compartments faster than it is adapted to flow through the inlet holes 52 and 53.

In this way the amount of oil in the bottom of the bearing compartments is limited to a definite amount that is preferably extremely small but which can be controlled by suitably relating the radii of the outer races and of the spiral groove pump members at 11 and 12.

A desirable feature of my invention is directed to the water cooling of a lubricated high-speed roller bearing.

I surround the bearings with a water jacket and maintain a flow of water through the jacket so as to maintain the oil and the bearing cool. In the illustration water inlet may be provided at 58 and water outlet at 59, or, vice versa, the water inlet may be 59 and the outlet at 58.

In the form just described, I flow the oil into the bearings from below by gravity and pump it out at a predetermined level along the spiral grooves 11 and 12, thereby maintaining the oil at a definite predetermined level in the bottom of each outer race. As subsequently shown, both directions of flow may be made a gravity flow in both directions.

I may, as illustrated in Figure 4, reverse the operation, then flowing the oil in by pump and discharging it by gravity through a suitable overflow pipe. In this event if the spiral grooves 11 and 12 spiral in opposite direction from that of Figure 1, the direction of rotation of the shaft may be the same, the oil being pumped into the bearing in the form of Figure 4 and out of the bearing in the form of Figure 1.

In Figure 4 the oil is drawn continuously by the speeding shaft and spiral grooves 60 from an outside reservoir 61 up through a small bore pipe 62, to and through the spiral groove 60 to the bearing.

In the bearing of the oil flows along the passage 50 and upwardly through the openings 54, 55 and 56 into the grooves of the outer races and overflows out a suitable pipe 63 which returns the oil to the reservoir 61.

I show the overflow pipe 63 vertically adjustable at 64 so as to permit the best level for the oil in the bearing to be determined by experiment and the oil level to be then adjusted to this predetermined best level.

It will be understood that the best level will normally vary somewhat according to operating conditions with respect to the quality of oil, the speed of rotation of the shaft and the character of the engaging surfaces as well as with some other factors such as the size of the balls and the radii of the ball races.

Preferably the oil level is kept below the ball retainer members 28.

Each ball travels through the film of oil at the bottom of the outer races once each time the ball travels around these races and the resultant film of oil upon the ball spreads over the entire ball so that the balls present properly oiled surfaces to the ball retainers.

My invention provides a thin depth of oil, which need be little more than a film, in the outer diameter of the outer ball race so that the balls travelling in the race will receive a film of oil continuously or with sufficient frequency for the oil to spread over the balls of the race, the depth of the oil being controlled and maintained to prevent flooding of the bearing.

It is obvious that there are many ways of accomplishing this result and that it can even be accomplished by as simple a construction as that shown in Figure 5, in which a ball race of the same character as that of any in Figure 1 is seen having inner and outer race members 23 and 29 and balls 27 and in which oil is admitted by gravity as through pipe 65 from any reservoir 66 and can be drained from the bottom of the outer race member by any suitable outlet pipe 67 to a storage not shown.

The position of the oil inlet in advance of the outlet in the direction of movement of the balls is a preferred position. Whatever the fact as to this, the outlet must be large enough to carry away the oil as fast as the oil flows to the outlet and the height of the outlet flow opening 68 will determine the depth of oil within this portion of the bearing.

That the method suggested does not require a machine for its operation may be seen from the fact that the inlet 65 may be the inlet from an ordinary hand oiler, though a maintained gravity oil supply from a reservoir would of course be preferable.

In Figure 6 a section is shown, corresponding generally with Figure 3, but in which gravity inlet is provided by pipe 69 from a source not shown and gravity outlet is provided over the side and through groove 70 so that flow of oil which takes place across the low portion of the outer ball race across the path of the travelling balls insures that the travelling balls shall each receive an application of oil as it passes this space. Whether the oil supplied be a mere film or have a considerable depth will depend upon the height of the overflow.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. A horizontal high speed shaft, a roller bearing supporting the shaft, walls forming an oil reservoir to hold a pool, outside the bearings, means for circulating oil from the pool into and out of a low portion of the bearing and means for water cooling the bearing and the oil of the pool.

2. A horizontal high speed shaft, horizontally spaced ball bearings supporting the shaft toward opposite ends thereof, each bearing having inner and outer vertical races, intermediate balls and a ball retainer spacing and carried around by the balls and means for flowing oil into each bearing and for maintaining the depth of oil over the low portions of the outer races in the paths of the travelling balls high enough to flow oil over the low portion of the outer race and low enough to avoid contact with the travelling retainer except as received from the balls, said means including an oil reservoir having a portion higher than a low portion of the outer races and a throttling conduit connection into the bearings and means operated by the rotation of the shaft for continuously removing oil from the bearing as it reaches a predetermined elevation great enough to maintain oil over a low portion of the outer race.

3. A horizontal high speed shaft, spaced ball bearings, walls forming an oil reservoir around the shaft intermediate the bearings and a housing for the shaft having a spiral groove around the inner diameter of the housing adjacent each bearing and along the closely adjacent outside surface of the rotating shaft and adapted to direct oil inwardly from the bearing toward the reservoir and having a small conduit connection from the reservoir to each bearing so that the oil flows to each bearing by gravity and is pumped back by the cooperating action of the grooved housing and the adjacent rotating surface of the shaft.

4. A horizontal high speed shaft, a housing supporting the shaft, a roller bearing intermediate the housing and shaft supporting the shaft and including an inner race upon the shaft, an outer stationary race in the housing and balls intermediate the races, the said housing being grooved vertically beneath the axis of the shaft below the outer race to provide oil conduit to opposite sides of the race, means for delivering oil into the groove so that it flows upwardly into the outer race and overflows the low portion of the outer race into the path of the travelling balls, and an oil discharge operated by rotation of the shaft having an inlet from the bearing at a low portion of the bearing sufficiently high to insure oil within the low portion of the outer bearing.

5. In a ball bearing shaft equipment, a high speed horizontal shaft, a housing about the shaft close to the shaft at one part of the shaft length, ball bearing inner and outer races upon the shaft and within the housing respectively, balls between the races and a circulating system for providing and limiting oil depth within the outer races, comprising gravity oil feed in one path of the circuit and pumping means at another part of the circuit located where the housing and shaft come close together and distinguished by spiral grooves in the housing made effective by the high speed movement of the shaft adjacent the grooves.

6. A horizontal high speed shaft, a roller bearing supporting the shaft having inner and outer races and intermediate balls, means for delivering a small quantity of oil into the low portion of the bearing and a vertically adjustable outlet from the bearing for adjustably controlling the height of a maintained small depth of oil in the bearing.

7. A horizontal high speed shaft, a housing surrounding the shaft and including an oil reservoir at an intermediate point, roller bearings between the shaft and housing on opposite sides of the reservoir, means for circulating oil from the reservoir into the bearings and back to the reservoir continuously holding the oil level during the rotation of the shaft at a low portion of the bearing and a water jacket surrounding the bearings and jacketing a portion of the reservoir.

CLIFFORD T. RAULE.